US012392011B2

(12) United States Patent
Guidetti et al.

(10) Patent No.: US 12,392,011 B2
(45) Date of Patent: Aug. 19, 2025

(54) PROCESS FOR THE SELECTIVE RECOVERY OF TRANSITION METALS FROM ORGANIC RESIDUES

(71) Applicant: ENI S.P.A., Rome (IT)

(72) Inventors: Stefania Guidetti, San Donato Milanese (IT); Alberto Renato De Angelis, San Donato Milanese (IT)

(73) Assignee: ENI S.P.A., Rome (IT)

( * ) Notice: Subject to any disclaimer, the term of this patent is extended or adjusted under 35 U.S.C. 154(b) by 935 days.

(21) Appl. No.: 17/413,068

(22) PCT Filed: Dec. 11, 2019

(86) PCT No.: PCT/IB2019/060668
§ 371 (c)(1),
(2) Date: Jun. 11, 2021

(87) PCT Pub. No.: WO2020/121220
PCT Pub. Date: Jun. 18, 2020

(65) Prior Publication Data
US 2021/0388462 A1      Dec. 16, 2021

(30) Foreign Application Priority Data

Dec. 11, 2018   (IT) .................. 102018000010955

(51) Int. Cl.
*C22B 7/00*       (2006.01)
*B01D 9/00*       (2006.01)
(Continued)

(52) U.S. Cl.
CPC ............ *C22B 7/009* (2013.01); *B01D 9/0054* (2013.01); *B01D 11/0488* (2013.01);
(Continued)

(58) Field of Classification Search
None
See application file for complete search history.

(56) References Cited

U.S. PATENT DOCUMENTS

| 4,518,484 A * | 5/1985 | Mann ..................... C10G 21/24 208/309 |
| 6,190,542 B1 | 2/2001 | Comolli et al. |

(Continued)

FOREIGN PATENT DOCUMENTS

| DE | 102014107374 A1 * | 11/2015 | ............. B01D 15/00 |
| RU | 30775 B1 | 9/2018 | |

(Continued)

OTHER PUBLICATIONS

Rispoli G.; et al.; "Deep Conversion of black oils with Eni Slurry Technology"; presented at the 21st World Energy Congress (WEC); Montreal, Quebec, Canada, 2010. (Year: 2010).*

(Continued)

*Primary Examiner* — Sally A Merkling
*Assistant Examiner* — Austin Pollock
(74) *Attorney, Agent, or Firm* — Ruggiero McAllister & McMahon LLC

(57) ABSTRACT

There is a process for the selective recovery of transition metals from an organic stream containing transition metals. The organic stream and possibly a first extractor if solid, are melted up to the liquid state. The extractor consists of an ionic liquid or a mixture of two or more ionic liquids and the ionic liquid contains an ammonium salt as cation and as anion an anion with chelating properties. A melted organic stream and a first extractor, optionally melted, are fed to a first liquid-liquid extraction unit working at a temperature of at least 150° C. where the liquid-liquid extraction is carried out obtaining a liquid mixture containing an ionic liquid, or a mixture of two or more ionic liquids, and metals. After extraction, the liquid mixture is cooled at a temperature (Continued)

between 0° C. and 70° C. and becomes biphasic; then the cooled mixture is sent to a first separation unit, to separate a liquid phase that contains ionic liquids and metals, and a metal-depleted solid phase. After the first separation, the separated metal-depleted solid phase is optionally sent to a washing unit to which a solvent is fed, so as to eliminate the residual ionic liquid by transferring it into the solvent and obtaining a metal-depleted solid phase. Then the separate liquid phase containing ionic liquids and metals is sent into a liquid-liquid precipitation and separation unit, adding a counter-solvent, thereby obtaining a solid phase containing the metals and a liquid stream containing counter-solvent and ionic liquids.

17 Claims, 1 Drawing Sheet

(51) Int. Cl.
*B01D 11/04* (2006.01)
*C10G 67/04* (2006.01)
*C22B 3/26* (2006.01)
*C22B 34/22* (2006.01)
*C22B 34/34* (2006.01)

(52) U.S. Cl.
CPC .......... *B01D 11/0492* (2013.01); *C10G 67/04* (2013.01); *C22B 3/26* (2021.05); *C22B 34/225* (2013.01); *C22B 34/345* (2013.01)

(56) References Cited

U.S. PATENT DOCUMENTS

| | | | | |
|---|---|---|---|---|
| 7,553,406 | B2 | 6/2009 | Wasserscheid et al. | |
| 8,608,949 | B2* | 12/2013 | Bhattacharyya | C10G 21/28 585/860 |
| 8,608,950 | B2* | 12/2013 | Serban | B01D 11/0492 585/860 |
| 8,608,951 | B2* | 12/2013 | Serban | B01D 11/0492 208/251 R |
| 8,912,351 | B2* | 12/2014 | Mezza | C10G 3/57 554/176 |
| 2012/0067784 | A1* | 3/2012 | Gallup | C10G 21/24 208/251 R |
| 2012/0121485 | A1* | 5/2012 | Rogers | C10G 25/003 548/402 |
| 2013/0078167 | A1* | 3/2013 | Grimley | C22B 7/008 423/55 |
| 2013/0081976 | A1* | 4/2013 | Heraud | C10G 67/0454 208/96 |
| 2013/0087481 | A1* | 4/2013 | Heraud | C10G 65/10 208/89 |
| 2013/0180887 | A1* | 7/2013 | Bauer | C10G 19/02 208/251 R |
| 2015/0090638 | A1* | 4/2015 | Gattupalli | B01D 11/04 208/208 R |

FOREIGN PATENT DOCUMENTS

| | | |
|---|---|---|
| RU | 2673539 C1 | 11/2018 |
| WO | 2010/116165 A2 | 10/2010 |
| WO | 2011/090610 A2 | 7/2011 |
| WO | 2011/090617 A2 | 7/2011 |
| WO | WO-2016161206 A1 * | 10/2016 |

OTHER PUBLICATIONS

Corbett P., et al.; "Use of Ionic Liquids to remove harmful M2+ contaminants from hydrocarbon streams"; Molecular Systems Design and Engineering, 2018 (Year: 2018).*

Energy Education, "Fractional Distillation", retrieved from internet on Jan. 7, 25, https://energyeducation.ca/encyclopedia/Fractional_distillation (Year: 2025).*

Abdullah S.; "Ionic Liquids Classification for Fuel Desulphurization", Int. J. of General Engineering and Technology, vol. 2, Issue 2, 2013, p. 29-38 (Year: 2013).*

Russian Federation Office Action dated Mar. 20, 2023 for Russian Patent Patent Application No. 2021120025, 11 pages.

International Search Report dated Mar. 5, 2020 for PCT application No. PCT/IB2019/060668.

Written Opinion dated Mar. 5, 2020 for PCT application No. PCT/IB2019/060668.

Second Written Opinion dated Nov. 27, 2020 for PCT application No. PCT/IB2019/060668.

International Preliminary Report on Patentability dated Mar. 23, 2021 for PCT application No. PCT/IB2019/060668.

Clough et al; "Thermal Decomposition of Carboxylate Ionic Liquids: Trends and Mechanisms"; Physical Chemistry Chemical Physics; vol. 15, No. 47; Jan. 1, 2013; p. 1-16.

Wilfred et al; "Synthesis Characterization and Thermal Properties of Thiosalicylate Ionic Liquids"; J. Chem. Sci. vol. 125, No. 6; Nov. 2003; pp. 1511-1515.

Chinese Office Action dated Apr. 28, 2022 for Chinese Patent Appl. No. 201980082656.3.

* cited by examiner

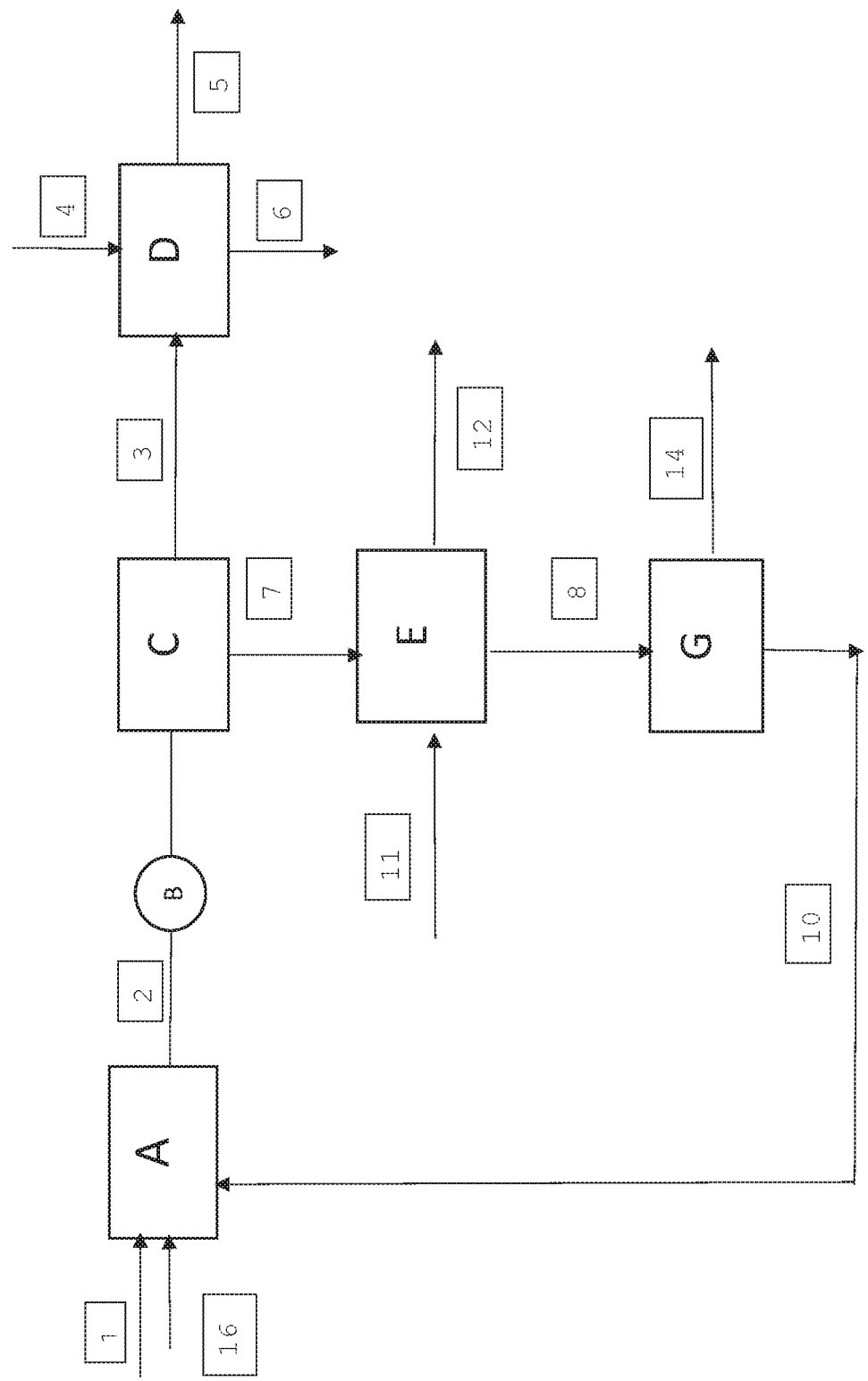

PROCESS FOR THE SELECTIVE RECOVERY OF TRANSITION METALS FROM ORGANIC RESIDUES

CROSS-REFERENCE TO RELATED APPLICATIONS

This application claims priority based on PCT Application No. PCT/IB2019/060668, filed Dec. 11, 2019, which claims priority from Italian Patent Application No. 102018000010955, filed on Dec. 11, 2018, the disclosures of both of which are incorporated herein by reference in their entireties.

FIELD OF THE DISCLOSURE

The present disclosure relates to a process for the selective recovery of transition metals from an organic stream which can be produced in refinery processes and/or in hydro-conversion processes of heavy hydrocarbons, preferably it can be produced in Eni Slurry Technology (EST) hydro-conversion processes owned by Eni S.p.A.

DESCRIPTION OF THE RELATED ART

A preferred chemical-physical treatment is that described in WO 2017/109728, which describes a process for the treatment of refinery purge streams which comprises the following steps:
 taking a purge stream from a refinery containing a hydrocarbon component in a slurry phase having a boiling point higher than or equal to 140° C., characterized by the presence of quantities of asphaltenes higher than or equal to 5% by weight and characterized by the presence of solids contents higher or equal to 5% by weight;
 mixing said purge, at a temperature higher than or equal to 100° C., with a mixture of hydrocarbons or flux that has a total aromatic content comprised between 50% and 70% by weight, and a starting boiling point equal to or higher than the temperature at which the mixing is conducted, so as to form a suspension with a content higher than or equal to 10% by weight of compounds having a boiling point $T_{bp}$ lower than or equal to 350° C.;
 sending said suspension to a liquid-solid separation stage, which operates at a temperature higher than or equal to 100° C., separating a solid phase containing a residual organic component and a solid component, cake, and a liquid phases containing solid residues;
 cooling the solid phase thus obtained under 60° C., and storing by keeping it at a temperature lower than or equal to 60° C.

In said process the weight ratio between purge and flux ranges between 1:0.5 and 1:4, and the average residence time of the mixture during mixing and before the liquid-solid separation is lower than or equal to 12 hours.

A further preferred chemical-physical treatment is that described in WO 2018/178927, which describes a method for the physical separation of solids and asphaltenes with a conversion degree higher than or equal to 90%, present in refinery purge streams. Said method provides for heating a refinery purge stream at a temperature higher than or equal to 185° C. and not above 220° C., preferably between 200 and 220° C., and subsequently subjecting said heated purge to sedimentation by progressively lowering and in a controlled manner the temperature up to the minimum temperature of 100° C., preferably comprised between 100° C. and 170° C., more preferably comprised between 100° C. and 160° C., without stirring the purge, so as to form a light phase and a heavy phase as a function of density.

The controlled lowering of the temperature can occur in different ways:
 by using an adequately sized and thermostated tank, for example hot-oil thermostated, or
 by mixing the hot stream to be decanted, for example the heated purge, with a cold stream, for example the pitch which can be at a temperature ranging from 200° C. to 80° C., considering the appropriate thermal balance of the system to calculate the flow rates.

In the method described in WO 2018/178927 the lowering of the temperature is of a value ranging from 3° C. per minute to 10° C. per minute, preferably from 5° C. per minute to 10° C. per minute, more preferably 10° C. per minute.

In the method described in WO 2018/178927 the time required for the formation of a heavy phase or cake can range from preferably 15 minutes to 2 hours, more preferably it ranges between 20 minutes and 1 hour. In the method described in WO 2018/178927 the sedimentation rate is preferably comprised between 85 mm/hour and 300 mm/hour.

Crude oil, raw material of the refinery, contains traces of heavy metals. Refinery processes therefore generate organic residual products containing transition metals.

The treatment of these organic residual products can also involve a problem of environmental impact: for example in cement factories the concentration of heavy metals in the final product is increased and, if the combustion fumes are not effectively reduced, also in the surrounding environment.

The loss of transition metals also has a significant economic impact as some metals such as molybdenum and vanadium have a significant value which is destined to rise further with the industrial development of some Far East countries.

The patent application WO 2014/025561 describes a process for the recovery of a catalyst by hydro-cracking from an effluent coming from a hydro-cracking slurry zone. Said process provides for the effluent to be separated into a first stream containing solvent and a pitch, and into a second stream which contains pitch and catalyst.

Separation can take place by centrifugation, filtration, decantation or electrostatic separation. The second stream is treated by leaching with acid so as to extract the catalyst and form an aqueous solution and a residue. The aqueous solution is then treated with anions to form an insoluble salt, the catalyst, and a further aqueous solution.

US 2013/0247406 describes an integrated process which comprises:
 a process for valorising heavy crude oils to convert them into lighter products in the presence of a catalyst;
 a deoiling process in which heavy residues and heavier products deriving from the treatment of heavy crude oils are separated by the exhausted catalyst which will be subsequently recovered;
 a synthesis zone of the catalyst.

The separation of the catalyst takes place by treatment with filtration technologies on membranes, and a subsequent stage of thermal devolatilization.

WO 2009/070778 describes a method for the recovery of the metals of an exhausted catalyst used in a slurry process for the valorisation of heavy oils. According to WO 2009/070778 the phase containing the exhausted catalyst is subjected to pyrolysis and the pyrolysis residue is put in contact with a leaching solution containing ammonia and with air, to dissolve the metals of the VIB and VIII groups and form a pressurized slurry. Said slurry contains at least one soluble metallic complex of the VIB and VIII group, ammonium sulfate and a solid residue containing at least one metal complex of the VB group and coke.

Subsequently the solid residue containing ammonium metavanadate and coke from the pressurized slurry is separated and removed. A portion of the metals of the VIII group is precipitated. The precipitation is carried out at a predetermined pH to selectively precipitate a portion of the metal complexes of the VIB and VIII groups.

US 2010/0122938 concerns a process for separating ultra-fine hydro-cracking solid catalysts from a liquid slurry of hydrocarbons, said solids being present in a quantity comprised between 5% and 40% by weight. The process envisages the following stages:
  cooling a slurry stream containing hydrocarbons and solids, preferably at a temperature ranging from 55° C. to 75° C.;
  mixing said stream cooled with a solvent in a solvent/slurry weight ratio ranging from 3:1 to 1:3, to form a first mixture containing liquid hydrocarbons, solvent and a stream containing the heavy hydrocarbon that encapsulates the catalyst solid;
  separating the first mixture in a first centrifuge to form a second mixture containing a low concentration of heavy hydrocarbon that encapsulates the catalyst solid, and a third mixture containing heavy hydrocarbon that encapsulates the catalyst solid;
  separating the second mixture in at least one second centrifuge to form a fourth mixture containing solvent and liquid hydrocarbons, and a fifth mixture containing a significant concentration of heavy hydrocarbon which encapsulates the catalyst solid;
  mixing the third mixture and the fifth mixture forming a final mixture;
  drying the final mixture to form a mixture of hydrocarbons with impurities in the vapour phase and a coke-type solid residue;
  separating the impurities from the hydrocarbons and recovering the solid residue.

U.S. Pat. No. 7,790,646 describes a process for converting fine catalysts, present in quantities between 5 and 40% by weight, and contained in a slurry stream together with heavy oils in coke-type materials, from which the metals of the catalyst are then recovered. The process comprises the following steps:
  mixing a slurry containing heavy oils and an exhausted catalyst containing metal sulphides of the VIII and VI groups, with a solvent, preferably in a volumetric ratio comprised between 0.5/1 and 5/1, preferably at a temperature ranging from 25° C. at 80° C. thus making the asphaltenes precipitate;
  separating, preferably by decantation and/or centrifugation, the exhausted catalyst and the precipitated asphaltenes from the heavy oils and from the solvent;
  converting the precipitated asphaltenes into coke-like material containing metals that will be recovered by thermal pyrolysis.

EP 2440635 describes a process for recovering metals from a stream rich in hydrocarbons and carbonaceous residues which comprises the following stages:
  sending said stream to a primary treatment, carried out in one or more stages, wherein said stream is treated in the presence of a fluxing agent in a suitable apparatus, at a temperature ranging from 80° C. to 180° C. and subject to a liquid/solid separation to obtain a pitch consisting of liquids and a cake;
  optionally subjecting said separated cake to drying to remove the hydrocarbon component which has a boiling point lower than a temperature ranging from 300° C. to 350° C. from a cake;
  sending said cake, optionally dried, to a secondary thermal treatment which comprises:
    a flame-free pyrolysis at a temperature ranging from 400° C. to 800° C.;
    an oxidation of the pyrolysis residue carried out under oxidation conditions and at a temperature ranging from 400° C. to 800° C.

Patent application US 2010/0326887 describes the separation of a non-sticky pitch from a hydrocarbon slurry, by a distillation treatment which brings the Vacuum Gas Oil (VGO) content in the final product below 14% by weight. The solids are concentrated at the bottom of the column to form a pitch.

Mattew T. Clough: "Thermal decomposition of carboxylate ionic liquids: trends and mechanism" in Phys. Chem. 2013, 15, 20480-20495, discloses measurement of the thermal decomposition of some specific ionic liquids.

WO 2011/090610 discloses a process for removing a metal from a crude oil, including contacting said crude oil with an ionic liquid which is immiscible in the oil, for extracting a mixture containing ionic liquid and metals. Metals that can be removed are alkaline metals, earth-alkaline metals, transition metals, aluminum, copper, lead, antimony, a combination thereof. Typical ionic liquids are selected from imidazole, ammonium, phosphonium and pyridine. The mixture is thus separated at a lower temperature than the extraction step to remove residue crude oil. A de-emulsifier can be used in the extraction and separation step.

WO 2011/090617 discloses a process for removal of a metal from a thermal residue, keeping it in contact with an ionic liquid which is immiscible in the residue, thus producing a mixture containing ionic liquids and metals. Metals that can be present are alkaline metals, earth-alkaline metals, transition metals, aluminum, copper, lead, antimony, a combination thereof. Typical ionic liquids are selected from imidazole, ammonium, phosphonium and pyridine. The mixture is thus separated at a lower temperature than the extraction step to remove residue crude oil. A de-emulsifier can be used in the extraction and separation step. Extraction is carried out at least at 150° C. and subsequent separation is carried out at 80° C. Said method allows extraction of alkaline metals, earth-alkaline metals, transition metals, aluminum, copper, lead and antimonium, preferably nickel and vanadium. Experimental data show that removal of vanadium and nickel is not selective; whereas iron is selectively removed.

U.S. Pat. No. 7,553,406 discloses a purification process for hydrocarbons containing impurities. Extraction is carried out with an ionic liquid which is subsequently separated with the purpose of reducing the content of impurities in the hydrocarbons. The ionic liquids used in the process are formed by a cation and a anions which are specifically selected. Impurities to be removed are sulphur compounds, halogen compounds, nitrogen compounds.

WO 2010/116165 discloses the removal of mercury from a liquid or gaseous hydrocarbon, by contacting it with a specific ionic liquid; then the mixture is separated.

Processes are not known in the state of the art which are capable of effectively recovering metals present in organic phases, particularly when said metals are present in low concentrations and as insoluble salts in common organic solvents or in aqueous solutions.

SUMMARY OF THE DISCLOSURE

To overcome the drawbacks and limitations of the prior art the Applicant has found a process for the selective recovery of the transition metals, also present as sulphides, from an organic stream, preferably from a material defined as a cake and from a purge stream produced in hydro-conversion processes of heavy hydrocarbons, more preferably cake and purges produced in Eni Slurry Technology hydro-conversion processes, using suitable ionic liquids. The subject matter of the present patent application is a process for the selective recovery of transition metals from an organic stream containing transition metals which comprises the following steps:

a. melting said organic stream up to the liquid state and possibly a first extractor if solid, where said extractor consists of an ionic liquid or a mixture of two or more ionic liquids, wherein said ionic liquid contains an ammonium salt as cation and as anion an anion with chelating properties;

b. feeding to a first liquid-liquid extraction unit working at a temperature of at least 150° C., said molten organic stream and said first extractor, optionally melted, and carrying out the liquid-liquid extraction, obtaining a liquid mixture containing an ionic liquid, or a mixture of two or more ionic liquids, and metals;

c. after extraction, cooling at a temperature comprised between 0° C. (zero degrees centigrade) and 70° C. said liquid mixture, which after cooling is biphasic, and subsequently sending the biphasic mixture to a first liquid-solid separation unit, to separate a liquid phase that contains ionic liquids and metals, and a metal-depleted solid phase;

d. after the first separation, the separated metal-depleted solid phase is optionally sent to a washing unit to which a solvent is fed, so as to eliminate the residual ionic liquid by keeping it into the solvent and obtaining a washed metal-depleted solid;

e. sending the separate liquid phase containing ionic liquids and metals into a liquid-liquid precipitation and separation unit by adding a counter-solvent, thereby obtaining a solid phase containing the metals and a liquid stream containing counter-solvent and ionic liquids.

Advantageously with the described and claimed process it is possible to effectively extract the transition metals present in an organic stream produced in a refinery or in a hydro-conversion process of heavy hydrocarbons. As s function of the type of ionic liquid it is possible to selectively extract one or more metals.

BRIEF DESCRIPTION OF THE DRAWINGS

Further aims and advantages of the present disclosure will appear more clearly from the following description and from the accompanying FIGURE, given purely by way of a non-limiting example, which represent preferred embodiments of the present disclosure.

FIG. 1 depicts an embodiment of a process according to the present disclosure.

DETAILED DESCRIPTION OF THE DISCLOSURE

In the present patent application, all the operating conditions reported in the text must be understood as preferred conditions even if not expressly declared.

For the purposes of the present discussion the term "to understand" or "to include" also comprises the term "to consist in" or "essentially consisting of".

For the purposes of the present discussion the definitions of the intervals always comprise the extreme values unless otherwise specified.

For the purposes of the present discussion, said organic stream is defined as a system containing organic compounds having a boiling point higher than or equal to 340° C., such as for example the aromatic, aliphatic and asphaltenic compounds, and solids containing carbonaceous residues, metallic compounds which can contain sulphides of transition metals such as for example molybdenum, iron, nickel and vanadium, and having sub-millimetric dimensions.

In particular, said process is applied to the cake and purge streams produced with the hydro-conversion processes in the slurry phase, such as for example the EST process.

In the present patent application the term "purge" means organic streams in slurry phase which contain hydrocarbons having a boiling point higher than or equal to 340° C., characterized by the presence of quantities of asphaltenes higher than or equal to 5% by weight and characterized by the presence of solids content higher than or equal to 5% by weight, said solids containing carbonaceous residues, metallic compounds which can contain sulphides of transition metals such as for example molybdenum, iron, 13 nickel and vanadium, and having sub-millimetric dimensions.

For the purposes of this discussion, the term "solid" means the fraction insoluble in tetrahydrofuran, indicated in this text by the acronym THF-i.

For the purposes of this discussion, the term "asphaltenes" means the organic fraction soluble in tetrahydrofuran but insoluble in n-pentane.

Asphaltenes are classified according to their insolubility in n-paraffins (typically having 5 to 7 C5-C7 carbon 23 atoms). Such compounds generally consist of nuclei of aromatic polycondensates variously branched and joined together through linear chains. These compounds may contain heteroatoms (S, N) in their inside which give them their polar nature.

In the present patent application the term "cake" means a solid material at room temperature with characteristics that make it easily grindable and consequently transportable even for long stretches without making a particular thermostatic control necessary. This characteristic remains at temperatures ranging from 50° C. to 60° C.

The cake is hard at room temperature with a softening point between 80° C. and 100° C. and a degree of penetration from 2 dmm to 5 dmm (dmm indicates decimillimeters). The softening point is the temperature at which the solid cake becomes soft and indicates the dependence of the cake consistency on the temperature. The degree of penetration is measured according to the ASTM-D5-06 method and expresses in decimillimeters the penetration underwent by the material, at room temperature, through a needle of known weight.

The consistency of the cake is due to the high concentration of asphaltenic compounds with respect to the content of maltenes.

The cake may contain solids as defined above, containing carbonaceous residues, metallic compounds which may in turn contain sulphides of transition metals such as for example molybdenum, iron, nickel and vanadium, and having sub-millimetric dimensions.

For the purposes of the present discussion, maltenes means the set of those compounds soluble in both Tetrahydrofuran and n-pentane.

For the purposes of this discussion, the EST process (Eni Slurry Technology owned by Eni S.p.A.) for the hydroconversion of heavy oil products comprises the following steps:

Supplying to a hydro-conversion section in slurry phase a Molybdenum-containing catalyst precursor, heavy oil products and a hydrogen-containing stream;

Conducting a hydro-conversion reaction producing a reaction effluent which is subsequently separated at high pressure and high temperature into a vapour phase and a slurry phase;

Subsequently sending the separate vapour phase to a gas treatment section with the function of separating a liquid fraction from the gas containing hydrogen and hydrocarbon gases having from 1 to 4 carbon atoms; said liquid fraction comprising naphtha, atmospheric gas oil (AGO), vacuum gas oil (VGO);

Subsequently sending the slurry phase to a separation section which has the function of separating the Vacuum Gas Oil (VGO), Heavy Vacuum Gas Oil (HVGO), Light Vacuum Gas Oil (LVGO), Atmospheric Gas Oil (AGO), from a stream of heavy organic products which contains asphaltenes, unconverted feed, catalyst and solid formed during the hydro-conversion reaction;

Recycling a part of said heavy organic products to the reaction section and forming a purge stream with the remainder.

In the EST process the purge can be optionally subjected to a chemical or chemical-physical treatment so as to form a light phase, called pitch, and a heavy phase, called cake.

The extraction efficiency in the present patent application is measured as the quantity of extracted metals. The quantity of extracted metals is defined as the difference between the quantity of metals in the organic stream fed into the first liquid-liquid extraction, and the quantity of metals contained in the metal-depleted solid obtained after washing with the solvent.

The extraction efficiency in the present patent application is calculated as the quantity of extracted metal according to the equation:

$$Me_{OUT}\% = 100 - \frac{m_{SDM,OUT}*[Me_{SDM,OUT}]}{m_{FR.ORG.,IN}*[Me_{FR.ORG.,IN}]} \quad [A]$$

In equation [A]:

$m_{SDM,OUT}$=mass of metal-depleted solid obtained after washing with solvent;

$Me_{SDM,OUT}$=concentration of metal in % m/m, measured on the sample of metal-depleted solid obtained after washing with solvent;

$m_{FR.ORG.,IN}$=mass of solid contained in the organic fraction;

$Me_{FR.ORG.,IN}$=concentration of metal in % m/m, measured on the organic fraction.

This way of calculating the extraction efficiency allows the best estimation of the extractive effectiveness of the metal, both in operational terms (only the extraction stage of the metals is carried out and not the precipitation thereof), and in analytical terms (two solids, the metal-free one and the concentrated metal one, are analysed).

With this method for measuring metals and calculating the efficiency, the Applicant has estimated molybdenum, vanadium, iron and nickel.

FIG. 1 illustrates a preferred embodiment according to the present disclosure, wherein (1) is the organic stream containing transition metals, preferably purge or cake, which is fed to the first extractor (A), (16) is the fresh ionic liquid which is fed to the first extractor (A), (2) is the liquid mixture which is cooled in (B). After cooling the mixture is biphasic, liquid phase and solid phase. Said biphasic mixture is separated in the liquid-solid separator (C) obtaining a metal-depleted solid phase (3) (metal-depleted solid phase in the present patent application means a phase which, at room temperature, with respect to the starting material has a lower content of metals and is enriched in organic components based on carbon and hydrogen) and a liquid phase (7) (i.e. a liquid phase which at room temperature contains ionic liquid and is rich in the metals that were present in the starting material). The solid phase (3) is sent to a washing unit (D) with solvent (4) to wash it from the ionic liquid which optionally remains on the solid, thus obtaining a metal-free solid phase and washed (5) and a washing solvent (6), from which a small amount of ionic liquid can possibly be recovered. The liquid phase containing ionic liquid and metals (7) is fed to a precipitation unit and liquid-solid separation (E). A counter-solvent (11) is also fed to (E) with the function of precipitating a solid stream (12) containing metals and recovering the ionic liquid (8). The counter-solvent containing residual ionic liquids (8) is recovered in an evaporation unit (G) forming counter-solvent (14) and metal-free ionic liquid (10) which is recycled to the first extraction unit (A).

The evaporation unit can preferably be a flash or a distillation column.

BEST MODE FOR CARRYING OUT THE DISCLOSURE

The process for the selective recovery of the transition metals from an organic stream object of the present patent application is now described, also with reference to FIG. 1.

The organic phases of a refinery process can contain sulphides of transition metals, in particular if they are produced in refinery processes and/or in hydro-conversion processes of heavy hydrocarbons. The process described and claimed in the present patent application preferably deals with organic phases which can be produced in refinery processes and/or in hydro-conversion processes of heavy hydrocarbons, preferably in the Eni Slurry Technology (EST) process owned by Eni S.p.A.

The organic stream can preferably be a purge or a cake produced in a hydro-conversion process of heavy hydrocarbons or in the EST process.

An organic stream, preferably a purge or a cake (1) and a first extractor (16) are brought to melt (up to the liquid state) and fed to a first liquid-liquid extraction unit (A) working at a temperature of at least 150° C.

The first extractor (16) consists of an ionic liquid, or a mixture of two or more ionic liquids.

In addition to the ionic liquid, a further extracting agent may be present, preferably selected from complexing molecules containing a thio group, among these molecules thiocarbazones, thiocarbamides, mercaptobenzenes and the aromatic carboxylic acids containing a thiol group are preferred. Among thiocarbazones dithizone is particularly preferred, thiourea is particularly preferred among thiocarbamides, thiophenol is particularly preferred among mercaptobenzenes and the thiosalicylic acid is particularly preferred among carboxylic acids containing a thiol group.

Ionic liquids which can be used to carry out the process described and claimed contain a quaternary ammonium or phosphonium salt as a cation and as an anion an anion with chelating properties.

The cation can be selected from an ammonium salt, such as preferably imidazolium, pyridinium, tetra alkylguanidinium, uronium, thiouronium; or a quaternary phosphonium salt. The anion can be selected from an anion with chelating properties, such as preferably salicylate, thiosalicylate, acetate, citrate, oxalate, malonate, dicyanide, and glutarate.

More preferably, the ammonium salt is imidazolium, variously substituted.

More preferably the anion with chelating properties is selected from acetate, salicylate, thiosalicylate, citrate.

Still more preferably the ionic liquid is selected from (1-butyl-3methylimidazolium)acetate, (1-butyl-3 methylimidazolium)dicyanoamide, (1-ethyl-3 methylimidazolium)salicylate, (1-ethyl-3 methylimidazolium)thiosalicylate.

After liquid-liquid extraction a liquid mixture is obtained containing an ionic liquid, or a mixture thereof, and metals (2).

The liquid mixture (2) is cooled in the range comprised between 0° C. to 70° C., preferably between 10° C. and 50° C., still more preferably at room temperature, becoming biphasic, and is subsequently sent to a first separation unit (C), to separate a liquid phase containing ionic liquids and metals (7) and a metal-depleted solid phase (3).

Preferably the separation takes place by filtration or centrifugation.

After separation, the metal-depleted solid phase (3) can optionally be sent to a washing unit (D) to which a solvent (4) is fed, so as to eliminate the residual ionic liquid by keeping it into the solvent (6) and obtaining the washed metal-depleted solid (5).

The separated liquid phase containing ionic liquids and metals (7) is subsequently treated in a precipitation unit and liquid-solid separation (E) with a counter-solvent (11) so as to recover the metals (12): during the counter-extraction the counter-solvent precipitates the metals (12) separating them from the ionic liquids (8).

Preferably the counter-solvent containing ionic liquids (8) can be further recovered in an evaporation unit (G) forming counter-solvent (14) and metal-free ionic liquid (10) which can be recycled to the first extraction unit (A).

Evaporation can preferably take place by flash or distillation.

Transition metals which can be selectively extracted with the process described and claimed are selected from scandium, titanium, vanadium, chromium, manganese, iron, cobalt, nickel, copper, zinc, yttrium, zirconium, niobium, molybdenum, ruthenium, rhodium, palladium, silver, cadmium, lanthanum, hafnium, thallium, tungsten, rhenium, osmium, iridium, platinum, gold and mercury; preferably they are selected from molybdenum, vanadium, nickel, cobalt, chromium, manganese and iron.

The liquid-liquid extraction step (A) can be repeated iteratively using different ionic liquids each time depending on the metal to be extracted.

In the extraction steps, a further additive or extracting agent different from the used ionic liquids can be used, preferably selected from complexing molecules containing a thio group, among these molecules, thiocarbazones, thiocarbamides, mercaptobenzenes and the aromatic carboxylic acids containing a thiol group are preferred.

Among thiocarbazones dithizone is particularly preferred, thiourea is particularly preferred among thiocarbamides, thiophenol is particularly preferred among mercaptobenzenes and the thiosalicylic acid is particularly preferred among carboxylic acids containing a thiol group.

Said further additive or extracting agent is not an ionic liquid.

The weight ratio of organic stream to ionic liquid, or mixture of ionic liquids, can preferably range between 1:10 and 1:0.5, more preferably between 1:4 and 1:0.5; more preferably between 1:1 and 1:0.9.

Said weight ratio does not include the further additive or extracting agent. If a further additive or extracting agent is present, the total quantity remains constant because a portion of ionic liquid is replaced by a portion of additive or extracting agent.

The weight ratio between the amount of organic stream fed to the first extraction unit and the sum of the quantity of ionic liquid, or mixtures of ionic liquids, and the quantity of extracting agent preferably ranges from 0.5/1 to 1/1, more preferably between 1.1/1 and 0.9/1, still more preferably is 1/1.

The solvent (4) used in the washing step (D) can be selected from methanol and tetrahydrofuran.

The counter-solvent used in the liquid-liquid extraction steps subsequent to the first one can be selected from water, ethanol, propanol and more preferably water.

The operating temperature at which the first extraction can be carried out preferably ranges between 150° C. and 250° C., preferably between 150° C. and 220° C., still more preferably between 150° C. and 200° C.

The operating temperature at which the first separation can be carried out preferably ranges between 0° C. and 70° C., preferably between 10° C. and 50° C., still more preferably at room temperature.

All extraction and separation operations can be carried out at atmospheric pressure, or by applying an overpressure of maximum 15 atm.

The reaction time during the extraction step preferably ranges between 4 hours and 48 hours, more preferably between 8 hours and 36 hours, still more preferably between 12 hours and 24 hours, still more preferably the reaction time is 24 hours.

Some application examples of the present disclosure are now described which have a purely descriptive and non-limiting purpose and which represent preferred embodiments according to the present disclosure.

EXAMPLES

Six experimental tests were conducted the working conditions and results of which are shown in Table 1 and 2.

These tests were conducted using the EST cake as a starting material, obtained by static sedimentation of the industrial purge stream. The material used has the chemical-physical characteristics of Table 1:

TABLE 1

| CAKE | | |
|---|---|---|
| Physical and chemical characteristics | | |
| Density_15° C. | kg/m$^3$ | 1200 |
| Penetration_25° C. | dmm | 2 |

TABLE 1-continued

| CAKE | | |
|---|---|---|
| Softening point (R&B) | ° C. | 107 |
| [VGO] | wt. % | 15% |
| Elemental composition | | |
| Carbon | % wt. | 85.9 |
| Hydrogen | % wt. | 5.9 |
| Nitrogen | % wt. | 1.3 |
| Sulphur | % wt. | 3.9 |
| Molybdenum | ppm wt. | 9410 |
| Nickel | ppm wt. | 3200 |
| Vanadium | ppm wt. | 8150 |
| Iron | ppm wt. | 970 |
| HPLC compound classes | | |
| Saturated | wt. % | 12.4 |
| Aromatic | wt. % | 17.7 |
| Resins | wt. % | 19.4 |
| Asphaltenes | wt. % | 34.8 |
| THF-insoluble | wt. % | 15.8 |

Extraction Step

The tests were conducted in a 30 cc extractor loaded with about 10-15 grams in total, considering the Cake, the ionic liquid and the possible addition of the extracting agent. The system is pressurized in nitrogen and heated to the operating temperature. The conditions are maintained for the entire extraction time. At the end of the test the system is depressurized, cooled and discharged from the reactor.

Separation Step.

The cooled extraction effluent is treated to obtain a solid phase at room temperature (the cake deprived of metals) and a liquid phase (the ionic liquid enriched with metals). This separation was carried out by filtration with a Teflon filter with a 0.45 micron porosity, or by centrifugation at 10,000 rpm for 10 minutes.

Washing of Solid

Once the solid phase has been recovered by filtration or centrifugation, the solid is washed at room temperature with about 50 cc of solvent, recovered by filtration, and dried at 100° C. for one night (SDM).

Recovery of Metals

Once the liquid phase has been recovered from the separation step, it is placed in a 100 ml flask and added with 50 ml of counter-solvent. The counter-solvent precipitates the metals and therefore leads to the formation of a solid phase which is recovered via filtration with a Teflon filter with 0.45 micron porosity and dried at 100° C. for one night. The liquid phase instead switches to the recovery step of the ionic liquid.

Recovery of the Ionic Liquid

The liquid phase is placed in a 100 ml flask and dried on the rotary evaporator placed under vacuum at 80° C. recovering the ionic liquid (which is known to be thermally stable) on the bottom of the flask and from the recovery flask the counter-solvent having a temperature of boiling lower than the ionic liquid.

Example 1

Table 2 shows the operating conditions used for the extraction in Example 1. That is, in this experiment 1-butyl-3methylimidazolium acetate (marketed by Aldrich, CAS No. [284049-75-8], 95%) was used as an ionic liquid (IL). No further extracting agent (EA) was added to the ionic liquid. The extraction was carried out inside a 30 cc volume reactor, at the initial pressure of 2 bars of nitrogen, at 200° C. for 24 h. 7.50 g of ionic liquid and 7.50 g of CAKE EST described in the previous paragraph were placed inside the reactor.

TABLE 2

| FIRST EXTRACTION Operating Conditions | | |
|---|---|---|
| Organic stream | | EST cake |
| Used Ionic Liquid | | BMIM (1-butyl-3 methylimidazolium) Acetate |
| Ionic Liquid (IL): CAS No., Aldrich No., Purity | | [284049-75-8], 95% |
| Extracting Agent Name(EA) | | — |
| Temperature | ° C. | 200 |
| Initial pressure | absolute atm | 2 |
| Time | h | 24 |
| Stirring | rpm | 500 |
| Reactor Volume | cc | 30 |
| EA IN quantity | g | 0.00 |
| IL IN quantity | g | 7.50 |
| IN Cake quantity | g | 7.51 |
| FIRST L/S SEPARATION: Operating Conditions | | |
| Type of separation | | Filtration 0.45 mm |
| Temperature | ° C. | 25° C. |
| WASHING OF SOLID: Operating Conditions | | |
| Temperature | ° C. | 25° C. |
| Solvent | | Methanol |
| RECOVERY OF METALS: Operating Conditions | | |
| Temperature | ° C. | 25° C. |
| Counter-solvent | | Water |
| Extracted Metals | | |
| Molybdenum | % | 1.2 |
| Vanadium | % | 58.1 |

After 24 hours of experiment the reactor was cooled and the content recovered. The content has a liquid and a solid component when cold. The two phases are separated according to the conditions shown in Table 2 in the FIRST L/S SEPARATION section: Operating Conditions.

The separation of the two phases obtained was carried out, for example 1 through filtration with a Teflon filter at room temperature. This operation allowed recovering the solid phase on the filter and the liquid phase in the flask.

The liquid phase (that is ionic liquid enriched in metals following extraction) was treated with water as a counter-solvent. The counter-solvent led to the precipitation of the metals and therefore to the obtainment of a solid/liquid mixture which was separated by filtration (Table 2 in the METAL RECOVERY section: Operating Conditions).

The solid (depleted of metals following extraction) was washed with methanol, keeping it on the filter, at room temperature so as to eliminate the superficially absorbed ionic liquid (Table 2 in the WASHING OF THE SOLID section: Operating Conditions).

From the elemental analysis of the metals on the starting CAKE EST and on the metal-deprived solid the % of the extracted metals was calculated.

Using 1-butyl-3methylimidazole Acetate as an ionic liquid under the extraction operating conditions shown in Table 2, 1.2% of Molybdenum was recovered with respect to the initial content in the EST CAKE and 58.1% of Vanadium in bulk.

Example 2

Table 3 shows the operating conditions used for the extraction in Example 2. That is, in this experiment 1-butyl-3 methylimidazolium acetate (marketed by Aldrich, CAS No. [284049-75-8], 95%) was used as an ionic liquid (IL). An extracting agent (EA) sulphuride (thiourea, commercial CAS No. [62-56-6], 99%) was added to the ionic liquid. The extraction was carried out inside a 30 cc volume reactor, at the initial pressure of 2 bars of nitrogen, at 200° C. for 24 h. 6.26 g of ionic liquid, 0.76 g of extracting agent and 7.03 g of CAKE EST described in the preceding paragraph were placed inside the reactor.

After 24 hours of experiment the reactor was cooled and the content recovered. The content has a liquid and a solid component when cold. The two phases are separated according to the conditions shown in Table 3.

The separation of the two phases obtained was carried out, for example 2, by centrifugation at 10000 rpm for 10 minutes at 100° C. This operation allowed recovering the solid phase and, separately, the liquid phase.

The content of metals present in the thus recovered solid was then analysed.

By applying the shown equation [A] it is obtained that by using 1-butyl-3 methylimidazolium acetate as an ionic liquid and adding thiourea as an extracting agent, under the extraction operating conditions shown in Table 3, 0.1% of Molybdenum was recovered with respect to the initial content in the EST CAKE and 36.4% of Vanadium in bulk.

Example 3

Table 4 shows the operating conditions used for the extraction in Example 3. That is, in this experiment 1-butyl-3 methylimidazolium acetate (marketed by Aldrich, CAS No. [284049-75-8], 95%) was used as an ionic liquid (IL). An extracting agent (EA) sulphuride (Dithizone, commercial CAS No. [(60-10-6], 85%) was added to the ionic liquid. The extraction was carried out inside a 30 cc volume reactor, at the initial pressure of 2 bars of nitrogen, at 200° C. for 24 h. 6.34 g of ionic liquid, 0.75 g of extracting 1 agent and 7.09 g of CAKE EST described in the preceding paragraph were placed inside the reactor.

TABLE 3

| FIRST EXTRACTION Operating Conditions | | |
|---|---|---|
| Organic stream | | EST cake |
| Used Ionic Liquid | | BMIM (1-butyl-3 methylimidazolium acetate) Acetate |
| Ionic Liquid (IL): CAS No., Aldrich No., Purity | | [284049-75-8], 95% |
| Extracting Agent Name(EA) | | Thiurea, [62-56-6], 99% |
| Temperature | ° C. | 200 |
| Initial pressure | absolute atm | 2 |
| Time | h | 24 |
| Stirring | rpm | 500 |
| Reactor Volume | cc | 30 |
| EA IN quantity | g | 0.76 |
| IL IN quantity | g | 6.26 |
| IN Cake quantity | g | 7.03 |
| FIRST L/S SEPARATION: Operating Conditions | | |
| Type of separation | | Centrifuge 10000 rpm 10 minutes |
| Temperature | ° C. | 100° C. |
| Extracted Metals | | |
| Molybdenum | % | 0.1 |
| Vanadium | % | 36.4 |

TABLE 4

| FIRST EXTRACTION Operating Conditions | | |
| --- | --- | --- |
| Organic stream | | EST cake |
| Used Ionic Liquid | | BMIM (1-butyl-3 methylimidazolium acetate) Acetate |
| Ionic Liquid (IL): CAS No., Aldrich No., Purity | | [284049-75-8], 95% |
| Extracting Agent Name(EA) | | Dithizone, [60-10-6], 85% |
| Temperature | ° C. | 200 |
| Initial pressure | absolute atm | 2 |
| Time | h | 24 |
| Stirring | rpm | 500 |
| Reactor Volume | cc | 30 |
| EA IN quantity | g | 0.75 |
| IL IN quantity | g | 6.34 |
| IN Cake quantity | g | 7.09 |
| FIRST L/S SEPARATION: Operating Conditions | | |
| Type of separation | | Centrifuge 10000 rpm 10 min |
| Temperature | ° C. | 100° C. |
| Extracted Metals | | |
| Molybdenum | % | 1.4 |
| Vanadium | % | 52.8 |

After 24 hours of experiment the reactor was cooled and the content recovered. The content has a liquid and a solid component when cold. The two phases are separated according to the conditions shown in Table 4.

The separation of the two phases obtained was carried out, for example 3, by centrifugation at 10000 rpm for 10 minutes at 100° C. This operation allowed recovering on the solid phase and, separately, the liquid phase.

The content of metals present in the thus recovered solid was then analysed.

By applying the aforementioned equation [A] it is obtained that by using 1-butyl-3 methylimidazolium acetate as an ionic liquid and adding dithizone as an extracting agent, under the extraction operating conditions shown in Table 3, 1.4% of Molybdenum was recovered with respect to the initial content in the EST CAKE and 52.8% of Vanadium in bulk.

Example 4

Table 5 shows the operating conditions used for the extraction in Example 4. That is, in this experiment 1-butyl-3 methylimidazolium acetate (marketed by Aldrich, CAS No. [448245-52-1], 97%) was used as an ionic liquid (IL). The extraction was carried out inside a 30 cc volume reactor, at the initial pressure of 2 bars of nitrogen, at 200° C. for 24 h. 5.42 g of ionic liquid and 5.45 g of CAKE EST described in the preceding paragraph were placed inside the reactor.

TABLE 5

| FIRST EXTRACTION Operating Conditions | | |
| --- | --- | --- |
| Organic stream | | EST cake |
| Used Ionic Liquid | | BMIM (1-butyl-3 methylimidazolium) dicyanoamide |
| Ionic Liquid (IL): CAS No., Aldrich No., Purity | | [448245-52-1], 97% |
| Temperature | ° C. | 200 |
| Initial pressure | absolute atm | 2 |
| Time | h | 24 |
| Stirring | rpm | 500 |
| Reactor Volume | cc | 30 |
| EA IN quantity | g | 0.00 |
| IL IN quantity | g | 5.42 |
| IN Cake quantity | g | 5.45 |
| FIRST L/S SEPARATION: Operating Conditions | | |
| Type of separation | | Centrifuge 10000 rpm 10 min |
| Temperature | ° C. | 100° C. |
| Extracted Metals | | |
| Molybdenum | % | 28.2 |
| Vanadium | % | 33.4 |

After 24 hours of experiment the reactor was cooled and the content recovered. The content has a liquid and a solid component when cold. The two phases are separated according to the conditions shown in Table 5.

The separation of the two phases obtained was carried out, for example 3, by centrifugation at 10000 rpm for 10 minutes at 100° C. This operation allowed recovering the solid phase and, separately, the liquid phase.

The content of metals present in the thus recovered solid was then analysed.

By applying the aforementioned equation [A] it is obtained that by using 1-butyl-3 methylimidazolium dicyanoamide as an ionic liquid, under the extraction operating conditions shown in Table 5, 28.2% of Molybdenum was recovered with respect to the initial content in the EST CAKE and 33.4% of Vanadium in bulk.

Example 5

Table 6 shows the operating conditions used for the extraction in Example 5. That is, in this experiment (IL) 1-ethyl-3methylimidazolium salicylate was used as an ionic liquid. The extraction was carried out inside a 30 cc volume reactor, at the initial pressure of 2 bars of nitrogen, at 200° C. for 24 h. 7.04 g of ionic liquid and 7.13 g of CAKE EST described in the preceding paragraph were placed inside the reactor.

TABLE 6

| FIRST EXTRACTION Operating Conditions | | |
|---|---|---|
| Organic stream | | EST cake |
| Used Ionic Liquid | | EMIM (1-ethyl-3 methylimidazolium) Salicylate |
| Temperature | ° C. | 200 |
| Initial pressure | absolute atm | 2 |
| Time | h | 24 |
| Stirring | rpm | 500 |
| Reactor Volume | cc | 30 |
| EA IN quantity | g | 0.00 |
| IL IN quantity | g | 7.04 |
| IN Cake quantity | g | 7.13 |
| FIRST L/S SEPARATION: Operating Conditions | | |
| Type of separation | | Centrifuge 10000 rpm 10 min |
| Temperature | ° C. | 100° C. |
| Extracted Metals | | |
| Molybdenum | % | 36.0 |
| Vanadium | % | 21.3 |

After 24 hours of experiment the reactor was cooled and the content recovered. The content has a liquid and a solid component when cold. The two phases are separated according to the conditions shown in Table 6.

The separation of the two phases obtained was carried out, for example 3, by centrifugation at 10000 rpm for 10 minutes at 100° C. This operation allowed recovering the solid phase and, separately, the liquid phase.

The content of metals present in the thus recovered solid was then analysed.

By applying the aforementioned equation [A] it is obtained that by using 1-ethyl-3methylimidazolium salicylate as an ionic liquid, under the extraction operating conditions shown in Table 6, 36.0% of Molybdenum was recovered with respect to the initial content in the EST CAKE and 21.3% of Vanadium in bulk.

Example 6

Table 7 shows the operating conditions used for the extraction in Example 6. That is, in this experiment (IL) 1-ethyl-3methylimidazolium thiosalicylate was used as an ionic liquid. The extraction was carried out inside a 30 cc volume reactor, at the initial pressure of 2 bars of nitrogen, at 200° C. for 24 h. 7.39 g of ionic liquid and 7.38 g of CAKE EST described in the preceding paragraph were placed inside the reactor.

TABLE 7

| FIRST EXTRACTION Operating Conditions | | |
|---|---|---|
| Organic stream | | EST cake |
| Used Ionic Liquid | | EMIM (1-ethyl-3 methylimidazolium) ThioSalicylate |
| Temperature | ° C. | 200 |
| Initial pressure | absolute atm | 2 |
| Time | h | 24 |
| Stirring | rpm | 500 |
| Reactor Volume | cc | 30 |
| EA IN quantity | g | 0.00 |
| IL IN quantity | g | 7.39 |
| IN Cake quantity | g | 7.38 |
| FIRST L/S SEPARATION: Operating Conditions | | |
| Type of separation | | Centrifuge 10000 rpm 10 min |
| Temperature | ° C. | 100° C. |
| Extracted Metals | | |
| Molybdenum | % | 25.5 |
| Vanadium | % | 29.7 |

After 24 hours of experiment the reactor was cooled and the content recovered. The content has a liquid and a solid component when cold. The two phases are separated according to the conditions shown in Table 7.

The separation of the two phases obtained was carried out, for example 3, by centrifugation at 10000 rpm for 10 minutes at 100° C. This operation allowed recovering on the solid phase and, separately, the liquid phase.

The content of metals present in the thus recovered solid was then analysed.

By applying the aforementioned equation [A] it is obtained that by using 1-ethyl-3methylimidazolium thiosalicylate as an ionic liquid, under the extraction operating conditions shown in Table 7, 25.5% of Molybdenum was recovered with respect to the initial content in the EST CAKE and 29.7% of Vanadium in bulk.

Comparing the results of the examples as shown in Table 8 it can be observed how, by changing the ionic liquid, it is possible to quantitatively vary the percentage of extracted metals and be more or less selective in the extraction of one metal at the expense of the other. In fact it can be observed as in Examples 1, 2, 3 where 1-butyl-3methylimidazole Acetate is used as an ionic liquid, preferably vanadium is extracted. By using other ionic 13 liquids with different molecular structure, molybdenum can also be extracted together with Vanadium.

TABLE 8

| | | FIRST EXTRACTION | | | | | |
|---|---|---|---|---|---|---|---|
| Example No. | | 1 | 2 | 3 | 4 | 5 | 6 |
| Organic stream | | EST cake | EST cake | EST cake | EST cake | EST cake | EST cake |
| Used Ionic Liquid | | BMIM (1-butyl-3 methyl-imidazolium) Acetate | BMIM (1-butyl-3 methyl-imidazolium) Acetate | BMIM (1-butyl-3 methyl-imidazolium) Acetate | BMIM (1-butyl-3 methyl-imidazolium) dicyanoamide | EMIM (1-ethyl-3 methyl-imidazolium) Salicylate | EMIM (1-ethyl-3 methyl-imidazolium) ThioSalicylate |
| Extracting Agent Name(EA) | | — | Thiurea, [62-56-6], 99% | Dithizone, [60-10-6], 85% | — | — | — |
| | | | | Extracted Metals | | | |
| Molybdenum % | % | 1.2 | 0.1 | 1.4 | 28.2 | 36.0 | 25.5 |
| Vanadium % | % | 58.1 | 36.4 | 52.8 | 33.4 | 21.3 | 29.7 |

The invention claimed is:

1. Process for the selective recovery of transition metals from an organic stream having a boiling point higher than or equal to 340° C. and containing transition metals which comprises the following steps:
   a. melting up to the liquid state said organic stream and possibly a first extractor if solid, where said first extractor consists of an ionic liquid or a mixture of two or more ionic liquids, wherein said ionic liquid contains a quaternary ammonium salt or a quaternary phosphonium salt as cation and an anion with chelating properties as anion;
   b. feeding to a first liquid-liquid extraction unit working at a temperature of at least 150° C. said molten organic stream and said first extractor, optionally melted, and carrying out the liquid-liquid extraction, obtaining a liquid mixture containing an ionic liquid, or a mixture of two or more ionic liquids, and the metals;
   c. after extraction, cooling at a temperature comprised between 0° C. (zero degrees centigrade) and 70° C. said liquid mixture, which after cooling is biphasic, and subsequently sending the biphasic mixture to a first liquid-solid separation unit, to separate a liquid phase that contains ionic liquids and metals, and a metal-depleted solid phase;
   d. after the first separation, the separated metal-depleted solid phase is optionally sent to a washing unit to which a solvent is fed, so as to eliminate the residual ionic liquid by keeping it into the solvent and obtaining a washed metal-depleted solid;
   e. sending the separate liquid phase containing ionic liquids and metals into a liquid-solid precipitation and separation unit and adding a counter-solvent, thereby obtaining a solid phase containing the metals and a liquid flow containing counter-solvent and ionic liquids,
   wherein the anion is selected from salicylate, thiosalicylate, acetate, citrate, oxalate, malonate, dicyanoamide, and glutarate, and
   wherein in the extraction step, in addition to the ionic liquid, an extracting agent selected from the group consisting of thiocarbazones, thiocarbamides, mercaptobenzenes and aromatic carboxylic acids containing a thiol group is used.

2. Process according to claim 1, wherein the counter-solvent containing residual ionic liquids is further recovered in an evaporation unit forming counter-solvent and metal-free ionic liquid which is recycled to the first extraction step.

3. Process according to claim 1, wherein the cation is selected from imidazolium, pyridinium, tetra alkylguanidinium, uronium, thiouronium; or a quaternary phosphonium salt.

4. Process according to claim 1, wherein the ionic liquid is selected from the group consisting of (1-butyl-3 methylimidazolium)dicyanoamide, (1-ethyl-3 methylimidazolium) salicylate, and (1-ethyl-3 methylimidazolium)thiosalicylate.

5. Process according to claim 1, wherein the separation takes place by filtration or centrifugation.

6. Process according to claim 1, wherein the weight ratio between said organic stream and the ionic liquid, or mixture of ionic liquids, ranges from 1:10 to 1:0.5.

7. Process according to claim 1, wherein the solvent used in the washing step is selected from methanol and tetrahydrofuran.

8. Process according to claim 1, wherein the counter-solvent used in the liquid-liquid extraction steps subsequent to the first one is selected from water, ethanol, propanol.

9. Process according to claim 1, wherein the operating temperature at which the first extraction is carried out ranges from 150° C. to 250° C.

10. Process according to claim 1, wherein the operating temperature at which the first separation is carried out ranges from 0° C. to 70° C.

11. Process according to claim 1, wherein the extraction and separation steps are at pressure lower than or equal to 15 atm.

12. Process according to claim 1, wherein the extraction time during the extraction step ranges from 4 hours to 48 hours.

13. Process according to claim 1, wherein said organic stream is produced in refinery processes and/or in hydro-conversion processes of heavy hydrocarbons.

14. Process according to claim 13, wherein said organic stream is produced in the "Eni Slurry Technology process" for the hydro-conversion of heavy oil products comprising the steps of:
   supplying to a hydro-conversion section in slurry phase a molybdenum-containing catalyst precursor, heavy oil products and a hydrogen-containing stream;
   conducting a hydro-conversion reaction producing a reaction effluent which is subsequently separated into a vapour phase and a slurry phase;
   subsequently sending the separate vapour phase to a gas treatment section with the function of separating a liquid fraction from the gas containing hydrogen and hydrocarbon gases having from 1 to 4 carbon atoms;

said liquid fraction comprising naphtha, atmospheric gas oil (AGO), vacuum gas oil (VGO);

subsequently sending the slurry phase to a separation section which has the function of separating the Vacuum Gas Oil (VGO), Heavy Vacuum Gas Oil (HVGO), Light Vacuum Gas Oil (LVGO), Atmospheric Gas Oil (AGO), from a stream of heavy organic products which contains asphaltenes, unconverted feed, catalyst and solid formed during the hydro-conversion reaction;

recycling a part of said heavy organic products to the reaction section and forming a purge stream with the remainder.

15. Process according to claim 13, wherein said organic stream is a purge or a cake produced in a hydro-conversion process of heavy hydrocarbons, wherein said purge is an organic stream in slurry phase characterized by the presence of quantities of asphaltenes higher than or equal to 5% by weight and by the presence of solids content higher than or equal to 5% by weight, said solids containing carbonaceous residues, metallic compounds containing sulphides of transition metals selected from the group consisting of molybdenum, iron, nickel and vanadium, and having sub-millimetric dimensions; and wherein said cake is a solid material at room temperature with a softening point, defined as the temperature at which the solid cake becomes soft, between 80° C. and 100° C., and a degree of penetration, measured according to the ASTM-D5-06 method, from 2 dmm to 5 dmm; the cake being grindable and consequently transportable at temperatures ranging from 50° C. to 60° C. without thermostatic control.

16. Process according to claim 1, wherein the transition metals which are selectively extracted are molybdenum and one or more selected from the group consisting of scandium, titanium, vanadium, chromium, manganese, iron, cobalt, nickel, copper, zinc, yttrium, zirconium, niobium, ruthenium, rhodium, palladium, silver, cadmium, lanthanum, hafnium, thallium, tungsten, rhenium, osmium, iridium, platinum, gold and mercury.

17. Process according to claim 16, wherein the one or more transition metals which are selectively extracted are selected from the group consisting of vanadium, nickel, cobalt, chromium, manganese and iron.

\* \* \* \* \*